O. C. ELBERT.
MANHOLE COVER.
APPLICATION FILED NOV. 15, 1920.
1,438,172.
Patented Dec. 12, 1922.
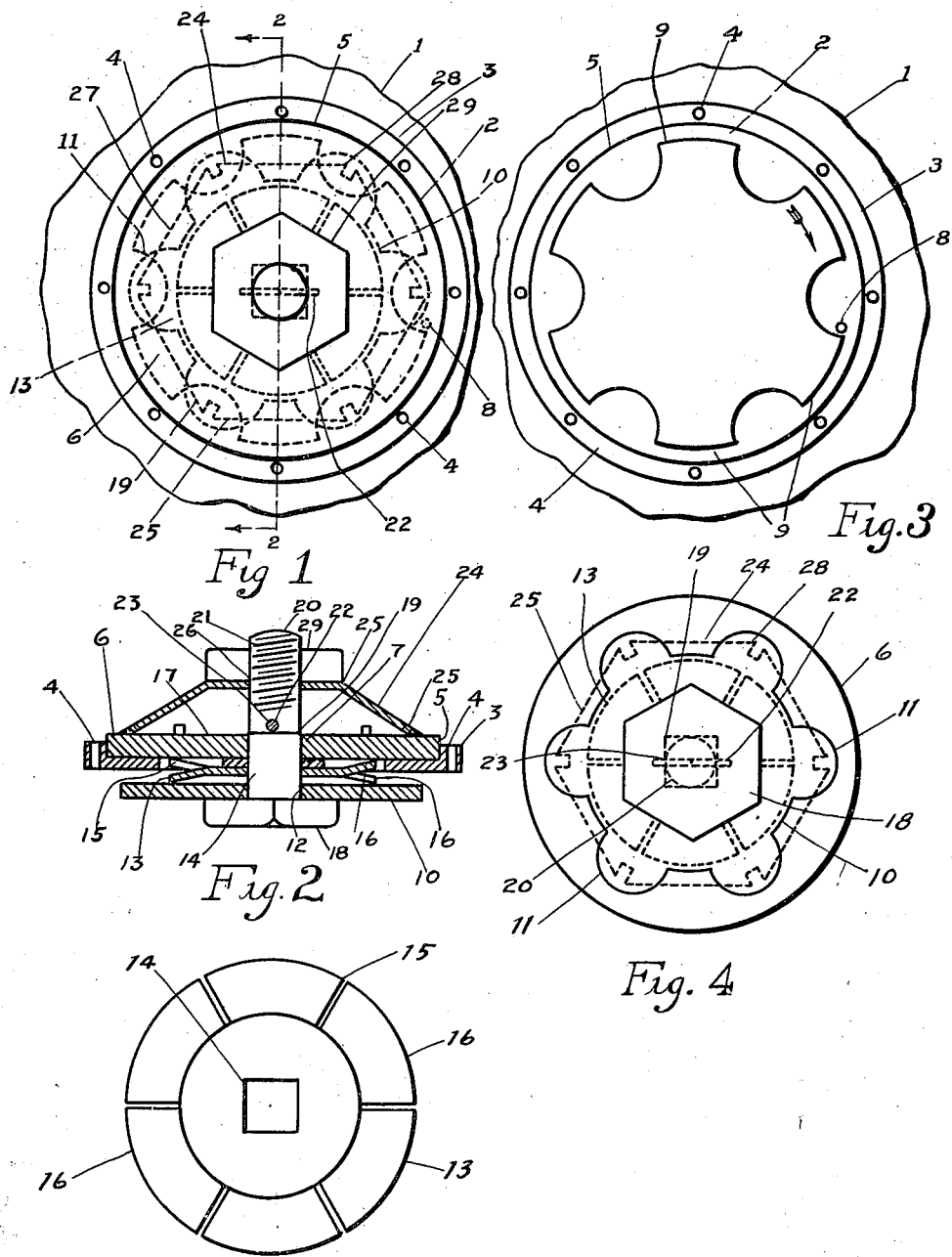
INVENTOR
Otto C. Elbert.
BY
Fred P. Gorin
ATTORNEY Patented Dec. 12, 1922.

1,438,172

UNITED STATES PATENT OFFICE.

OTTO C. ELBERT, OF BREMERTON, WASHINGTON.

MANHOLE COVER.

Application filed November 15, 1920. Serial No. 424,057.

*To all whom it may concern:*

Be it known that I, OTTO C. ELBERT, a citizen of the United States, and residing at Bremerton, in the county of Kitsap and State of Washington, have invented certain new and useful Improvements in Manhole Covers, of which the following is a specification.

This invention relates to improvements in man hole covers.

The principal object of the invention is to provide a cover which can be removably attached over a man hole in a tank or container and held thereto in a fixed and leakproof position by one screw.

These and other objects will appear as my invention is hereinafter more fully set forth in the following specification, shown in the accompanying drawings and finally pointed out in the appended claims.

In the drawings:

Fig. 1 is a top view showing the cover attached to a section of a tank or container.

Fig. 2 is a cross sectional side view of the cover and its locking means taken upon the line 2—2 of Fig. 1.

Fig. 3 indicates an annular flange attached to a section of a tank or container.

Fig. 4 is a bottom view of the cover.

Fig. 5 is a top view of a resilient separating washer.

Referring now more particularly to the drawings:

Reference numeral 1 indicates a section of a tank or container formed with a hole 2 and whose periphery is surrounded by an annular flange 3 formed with holes 4 which are in alignment with corresponding holes in the tank 1, through which bolts or rivets pass used in attaching the annular flange to a tank or container in a leakproof manner. The upper face of the annular flange 3 is formed with an annular depression 5 which receives a cover 6, said cover being formed with a square hole 7. In the bottom of the depression 5 of the said annular flange and integral therewith is a stop pin 8 whose one end extends below the bottom surface of said flange, the periphery of the flange opening being formed with cut-out portions 9. 10 is a locking plate whose outer periphery is formed with semi-circular projections 11. Disposed in the central portion of said plate is a square hole 12. Intermediate the locking plate 10 and the cover 6 is an especially formed resilient washer 13 formed with a squared hole 14 in its central portion and a plurality of rectangular notches 15 in its periphery the portions 16 in between said notches being alternately bent upwardly and downwardly, to provide portions designed for contact with the bottom of the cover 6 and portions designed for contact with the upper face of the locking plate 10 generally shown in Fig. 2. Intermediate the resilient washer 13 and the cover 6 is a rubber washer 17. 18 is a hexagon head screw having a square portion as at 19, the upper portion 20 above the said square being circular and formed with a thread 21, the locking plate 10, the resilient washer 13, the rubber washer 17 and the cover 6 being slidably mounted on the square portion 19 of the bolt 18 and kept thereon by a pin 22 which is forced into a lateral hole 23 in the circular portion 20 adjacent the square portion 19 of the screw 18 generally shown in Fig. 2. 24 is a resilient washer whose diverging edge 25 holds the horizontal portion thereon in a spaced relation with the cover 6, the horizontal portion being formed with a circular hole 26. The periphery of the said resilient washer is formed hexagon as shown at 27 in Fig. 1, the corners thereof being notched at 28 as shown in Figs. 1 and 2, said washer being slidably mounted on the threaded portion 21 of the screw 18.

Threadedly mounted on the threaded portion 21 of said screw is a hexagon nut 29.

In the operation of a cover as herein described, it can readily be understood that when a tank or container opening has an annular flange of the construction as herein described surrounding the periphery of the said opening and rigidly attached thereto that the projections 11 of the locking plate 10 are free to pass downward through the cut-out portions 9 in said flange subsequently allowing the plate 6 to rest in the depression 5 in said flange. The plate 10 is then rotated in the direction of the arrow as indicated at Fig. 3 until one of the projections 11 come in contact with the stop pin 8. The projections 11 of the locking plate 10 will then be underneath the projections in between the cut-out portions 9 of the said annular flange. The nut 29 which is threadedly mounted on the bolt 18 is rotated to bring the locking plate in contact with the bottom face of the said annular flange it being understood that the cover 6 cannot revolve, because of its relation with the squared portion 19 in a likewise manner in respect to the locking plate 10. When a sufficient tension has been applied to the locking plate 10 so as to hold it in a fixed relation with the said annular flange, it can be seen that the divergent edges of the resilient washer 25 will hold the cover 6 in a leakproof relation with the said annular flange. When it is desired to remove the cover 6 from the said flange this is accomplished by releasing the tension of the locking plate 10 by unscrewing the nut 29, subsequently allowing the resilient washer 16 to bring the locking plate 10 downward out of engagement with the said flange. It will then be seen that when the locking plate is relieved of its tension that the cover 6 will move away from the pin 8, which of course will let the operator know that the cover is free to be removed, said cover being removed by arranging the projections 11 of the plate 10 in position to pass through the cut-out portions 9 of the said flange.

While I have shown a particular form of embodiment of my invention, I am aware that many minor changes therein will readily suggest themselves to others skilled in the art, without departing from the spirit and scope of my invention. I therefore desire to avoid being limited to the exact form shown and described.

Having described my invention, what I claim as new and desire to protect by Letters Patent, is:

1. In combination with a tank or container having an opening, of an annular flange attached to said container in line with the opening, a portion of said flange being formed to receive the cover proper and having an edge formation of spaced cut-out portions, a cover to rest upon said projecting portion of the flange, a locking plate having peripheral projections adapted to pass thru the cut-out portions of the flange and to be mounted for rotative movement with respect to the flange to dispose the projections of said locking plate intermediate the cut-out portions of the flange, a resilient washer interposed between the locking plate and cover, and means for drawing said locking plate and cover toward each other, whereby the locking plate may be secured in cover-locking relation to the flange.

2. In combination with a tank or container having an opening, of an annular flange attached to said container in line with the opening, a portion of said flange being formed to receive the cover proper and having an edge formation of spaced cut-out portions, a cover to rest upon said projecting portion of the flange, a locking plate having peripheral projections adapted to pass thru the cut-out portions of the flange and to be mounted for rotative movement with respect to the flange to dispose the projections of said locking plate intermediate the cut-out portions of the flange, a resilient washer interposed between the locking plate and cover, means for drawing said locking plate and cover toward each other, whereby the locking plate may be secured in cover-locking relation to the flange, and means on said flange to limit the rotative movement of the locking plate with respect to the flange.

In testimony whereof I affix my signature in the presence of two witnesses.

OTTO C. ELBERT.

Witnesses:
 OSCAR J. HARSON,
 SUZANNE MCLAUGHLIN.